June 11, 1963 J. D. RUSSELL 3,092,993
STRAIN GAGES AND METHODS OF INSTALLING THE SAME
Filed April 10, 1961 4 Sheets-Sheet 1
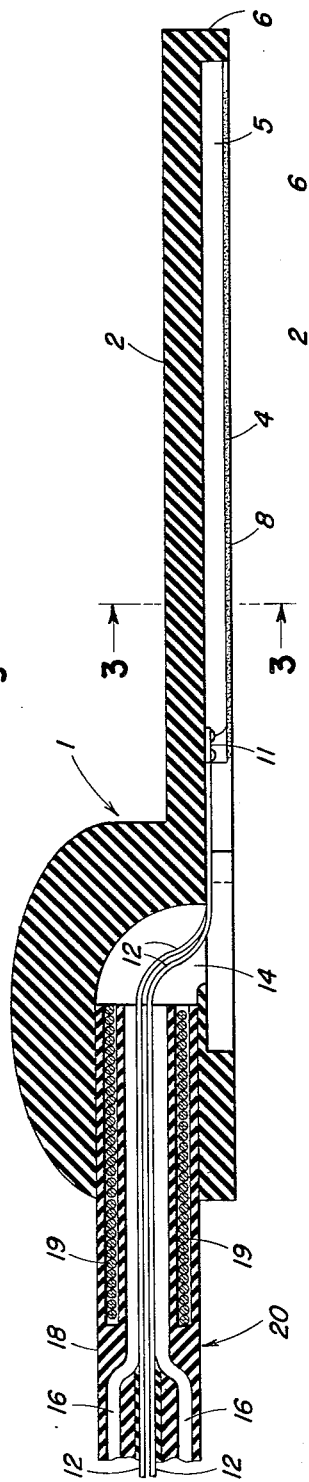
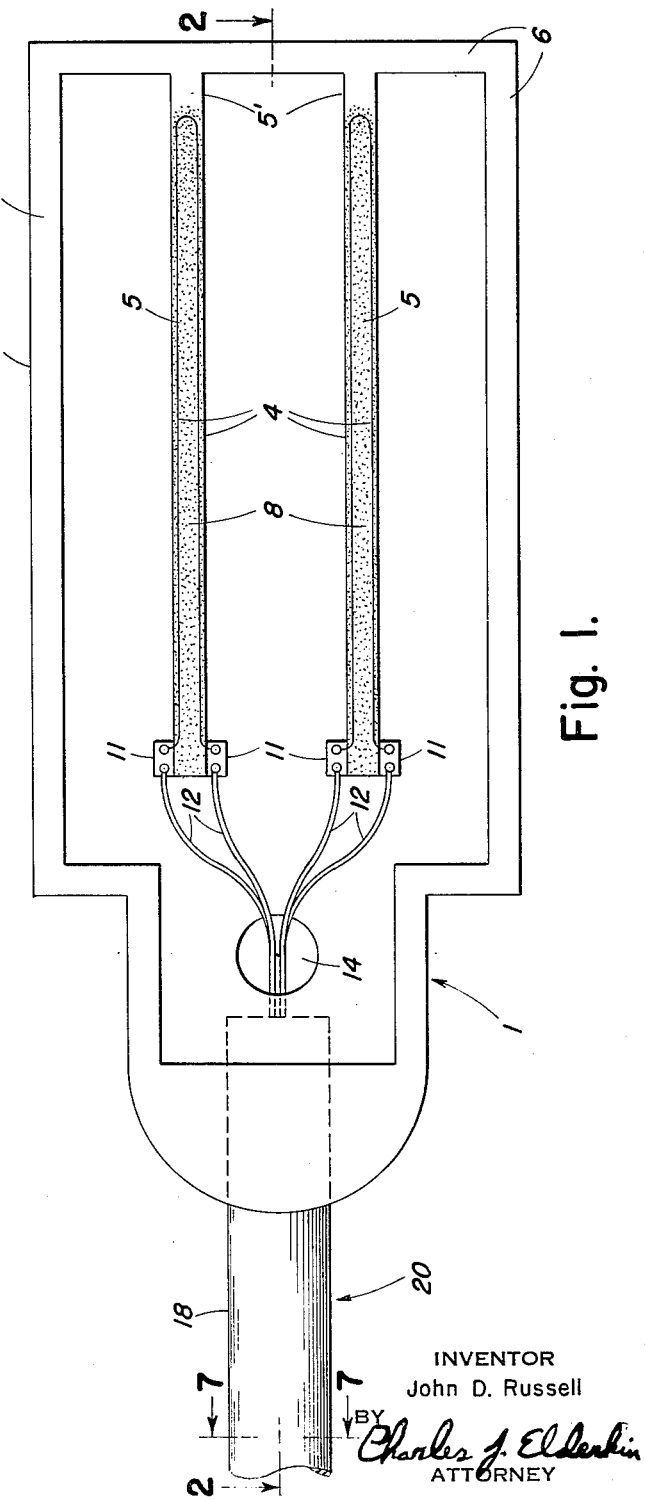
INVENTOR
John D. Russell
BY
Charles J. Elderkin
ATTORNEY June 11, 1963 J. D. RUSSELL 3,092,993
STRAIN GAGES AND METHODS OF INSTALLING THE SAME
Filed April 10, 1961 4 Sheets-Sheet 3

INVENTOR
John D. Russell
BY
Charles J. Elderkin
ATTORNEY

INVENTOR
John D. Russell
BY
Charles J. Elderkin
ATTORNEY

United States Patent Office 3,092,993
Patented June 11, 1963

3,092,993
STRAIN GAGES AND METHODS OF INSTALLING THE SAME
John D. Russell, Malibu, Calif., assignor to Microdot Inc., South Pasadena, Calif., a corporation of California
Filed Apr. 10, 1961, Ser. No. 101,949
9 Claims. (Cl. 73—88.5)

This invention relates to improvements in resistance wire strain gages as used for measuring strain in bodies subjected to variable stress. More particularly, the invention contemplates the provision of improved strain gages of the so-called "bonded filament" type which are characterized by their extreme ease of installation and removal as compared with gages heretofore employed by industry, and by their complete and substantially unlimited reusability. The invention further contemplates the provision of improved methods and procedures for the manufacture, installation and operation of resistance wire type strain gages as well as associated equipment used in the installation and operation of the unique type of strain gage hereinafter described.

Strain gages of the resistance wire or filament type have been in use for some time for measuring variable quantities such as strain, pressure, torque, acceleration, temperature, etc. The typical resistance wire strain gage contains a resistance element or wire connected in a conventional four-arm bridge circuit which ordinarily is balanced. The force to be measured is coupled mechanically to the resistance wire by various means, such that the force exerted on the wire through the coupling means causes the dimensions of the wire to be altered, which results in a proportional change in the resistance of the wire. This in turn causes unbalancing of the bridge in an amount at least roughly proportional to the force applied to the wire.

At the present time two principal types of resistance wire strain gages are in commercial use. One such gage, commonly referred to as the "bonded" type of gage, employs a resistance wire or filament which is bonded by means of cement, glue or similar adherent to the surface of a sheet of an insulating material, such, for example, as rice paper or thin plastic. The ends of the resistance wire are adapted to be connected to form one arm of a conventional four-arm bridge circuit. The insulating material is in turn adapted to be bonded by an adherent to a test specimen in which strain is to be measured. Strain applied to the specimen is transmitted through the bonded paper to the bonded filament or resistance wire and the resulting change in the dimensions and resistance of the wire is indicated by the relative degree of unbalancing of the bridge circuit. Suitable calibration provides means for measuring the magnitude of strain present in the test specimen.

One serious disadvantage of the conventional types of bonded-wire gages is that a curing period is required after the strain gage has been mounted on a test specimen in order to permit the cement or adherent to establish a firm bond between the test specimen and the insulating material carrying the resistance filament. A further disadvantage resides in the fact that known gages of the general class described are customarily destroyed upon removal and are not readily reusable. Furthermore, the resistance to ground or insulation characteristics of these conventional bonded gages cannot be determined or specified accurately prior to installation since they are affected appreciably by the installation procedure, i.e., by the nature and amount of insulating cement used in bonding the gage to the test specimen.

The second commercial form of resistance wire gage is that employing the so-called "unbonded" filament wherein the resistance wire is stretched around insulating supports which are adapted to be made movable with respect to each other in response to a strain introduced into the test specimen to which the gage is attached. This type of gage has the disadvantage that a pre-stress must be applied to the resistance wire when it is mounted on the insulating supports so that it can be employed to measure compressive forces satisfactorily. Furthermore, the unbonded type of gage is not readily adaptable for use on curved surfaces.

Further types of resistance wire strain gages have been described and claimed in my copending United States application Serial No. 754,956 entitled "Improvements in Strain Gages and Installation of the Same" which was filed on August 14, 1958. The gages of my aforementioned copending application overcome the disadvantages inherent in the bonded and unbonded types of gages by providing a unique arrangement for mounting the resistance element or filament such that the gage may be coupled or attached to a test specimen without the necessity of using time-consuming, thermo-sensitive adherents as in the conventional bonded gages, and wherein the resistance element or elements need not be pre-stressed as in the conventional unbonded gages. These gages are particularly well suited for high-temperature strain measurement work but are equally adaptable for use at ambient or slightly elevated temperatures, and may be employed in conjunction with test specimens of flat or curved surface contours. The basic gage structure as described in my copending application comprises a resistance element or filament mounted within a mass of compactable or compressible solid material having electrical and thermal insulating qualities, and wherein a suitable external metallic housing enclosing the insulating material and filament, is permanently deformed such as by drawing, crimping, etc., to exert a compressive force on the insulating material in such manner as to force the insulating material into firm compressive contact against the resistance element thereby effectively interlocking or frictionally clamping the resistance element in electrically and thermally insulated relationship to the external housing. Changes in the dimensions of the external housing introduced from a test specimen to which it is attached, are transmitted through the compressed insulating material to the clamped resistance filament causing a corresponding change in the dimensions and resistance of the filament. The external housing of the gage preferably is formed of a material such, for example, as thin sheet steel which is readily adaptable for rigid bonding, as by welding, to a metallic test specimen. In this manner, the gages of my copending application can be securely fastened to a test specimen very quickly and may be used for measurement work immediately thereafter, i.e., without the necessity of waiting for a bond to set or cure as in the conventional bonded gages. Further modifications of the basic gage are described in the copending application including, among others, low temperature weldable gages, and hermetically sealed gages.

The present invention provides a resistance wire strain gage adapted to adhere to a test surface without the use of cements, welding, or by means of devices such as tools or clamps; and which is easily and quickly removed for reuse in other test procedures as desired. Application of strain gages to test samples and removal therefrom for reuse may be accomplished in certain limited instances by means of clamping devices or the like; but such procedures are cumbersome; and are highly undesirable for use with light structures and high frequencies. Such devices are additionally, of course, impracticable for use on large planar surfaces and will, in any event, alter significantly the properties of the test sample, notably the strength and resonant frequency thereof.

In contrast, the gage of the present invention is readily installed on a test surface by mere placement of the gage against the test sample. A vacuum system effects adherence of the gage to the test surface.

Briefly the present invention involves a wire strain gage which comprises an insulating, fluid-impermeable receptacle; a strain resistance filament mounted on the interior thereof; a frictional and insulating coating applied to the surface of said filament; and means for producing a vacuum in said receptacle when the gage is applied to a test surface. More specifically, the invention contemplates a wire strain gage composed of a fine strain-responsive resistance filament; one or a plurality of such filaments being bonded or fitted to a ridge or ridges extending outwardly from an insulating, hard, resilient, flexible and impermeable pad and integral therewith, and a hard, abrasive, granular material such as emery, diamond dust or the like, bonded to the exposed under surface of each of the aforesaid ridges and gage filaments for inducing friction and providing insulating of the gage filament from the test surface. Conductors and semi-conductors may both be used as resistance filaments, and are intended to be embraced within the scope of this latter term and its equivalents as employed throughout the specification. The terms "insulating" and "insulation" as employed throughout this specification unless otherwise explicitly indicated are intended to describe materials which while not preventing transmission of strain and like forces are non-conductive to electrical current. About the edge of the pad is positioned a ridge which with the body of the pad defines a receptacle within which the aforesaid ridges and filaments are positioned. This peripheral ridge extending outwardly on the same side of the aforesaid pad as those bearing the gage filaments is continuous and smooth on its outer border. Leads are provided to the terminal ends of each of the gage filaments and an orifice is provided in the pad on the ridged surface thereof for vacuum means and the passage of the lead wires. Air is evacuated through the vacuum orifice when the receptacle, and specifically the free border or peripheral ridge and coated filaments contained in and bonded to the receptacle, are placed upon a test surface; the smooth peripheral ridge serving to preserve the vacuum thus created.

In order that the invention may be readily understood and the various objectives and advantages thereof clearly presented, reference is had to the accompanying drawings forming part of this specification, and illustrating certain apparatus embodying the invention and by which the method thereof is carried out. In these drawings:

FIGURE 1 is an elevational view of an illustrative vacuum gage produced by the procedure herein described;

FIGURE 2 is a longitudinal sectional view of the device as shown in FIGURE 1 along the line 2—2 as shown therein;

Figure 3:
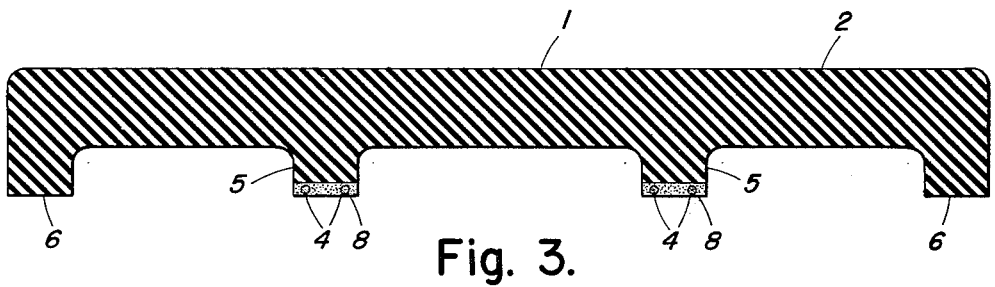
FIGURE 3 is a cross-sectional view of the device shown in FIGURE 1 taken along the lines 3—3 as indicated therein.
Figure 4:
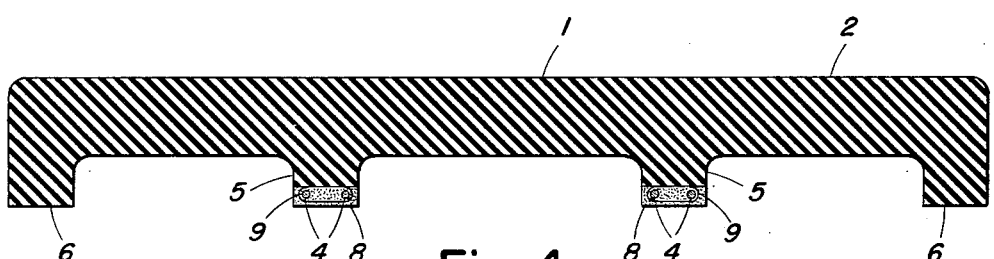
FIGURE 4 is a cross-sectional view of a modification of the device shown in FIGURES 1 to 3 taken at a level similar to that of FIGURE 3.

Referring with greater particularity to the drawings, FIGURES 1, 2, and 3 illustrate a vacuum gage designated in its entirety by the numeral 1 and comprising a vacuum cup or pad 2 and the gage filaments 4. The pad or receptacle 2 is formed of a hard, resilient, flexible, non-conductive material which is substantially impermeable to fluids. In one surface of the receptacle 2 are defined the ridges 5 and 6. Along the length of the ridge 5 are bonded the wire strain gage filaments 4 and on the free surface of each of which filaments 4 and the immediately adjacent ridge structure 5' there is bonded a friction-inducing, insulation-providing granular material 8. The peripheral ridge 6 extending outwardly at an angle from the edge of the pad or receptacle 2 has a smooth surface; its outward extension being in the same direction and the same distance substantially as that of the intermediate ridges 5. Satisfactory bonding materials for gages 1 to be employed at temperatures below 180° F. are thermoplastic cements such as, for example, celluloid dissolved in acetone. For higher gage operating temperatures, up to 300° F. or 400° F., a thermosetting cement, such as, for example, a phenolic resin, is desirably employed. Temperatures above 400° F. and within the range of about 400° F. to about 1000° F. generally necessitate ceramic cement materials. Different cements of the classes described are employed to bond the wire filaments 4 to the ridges 5 and to cause adherence of the granular material or grit to the filament 4 and ridge 5; and are characteristically mutually insolvent. In those instances where a gage is to be employed at temperatures of in excess of 1000° F., e.g. 2000° F. or more, the use of cementing material is precluded and a weldable gage element 9 as seen in FIGURE 4 or the like, as described in my copending application Serial No. 754,956, referred to above, is affixed to the pad ridge 5 which is composed for use at such elevated temperatures, of asbestos, woven glass, or the like. For use at lower temperatures rubber or plastic materials are normally employed in the pad structure.

The pressure exerted on the gage vacuum pad 2 causing its adherence to a test surface and resulting from the interior vacuum produced between the pad 2 and the test surface and effected by the procedure described hereinafter is normally atmospheric. Thus about fifteen (15) pounds per square inch (p.s.i.) of pressure may be readily and effectively applied to the pad surface. Higher pressures of up to about 150 p.s.i. are also readily obtainable as a result of the unique construction of the pad 2 normally employed in the practice of the invention which effectively concentrates the atmospheric pressure applied to the entire outer surface thereof at the ridge members 5 and 6 on the interior surface adjacent to the test surface. The resilient and flexible material of which the gage pads 2 are formed is for this reason, most desirably, sufficiently stiff to prevent collapse of the cup or pad in the evacuated state, yet sufficiently soft for low resistance to elongation to yield performance to strains of about $\pm 10 \times 10^{-4}$ inch per inch or more (e.g. $\pm 30,000$ p.s.i. with steel or $\pm 10,000$ p.s.i. in aluminum.) It is noted additionally, that a pressure above atmospheric can be applied to the outer surfaces of the pad to increase pressures. Thus, the pad itself may be utilized within a pressurized chamber with a pressure above atmospheric operating on the outer pad surface and the interior vacuum present under the pad, that is between the pad and test surface.

It is also feasible to form a gauge pad of a plurality of materials. In such an arrangement the roof or body of the pad or cup is of a stiffer material than that employed in the ridges 5' adjacent the filament. (See FIGURE 5).

Figure 5:
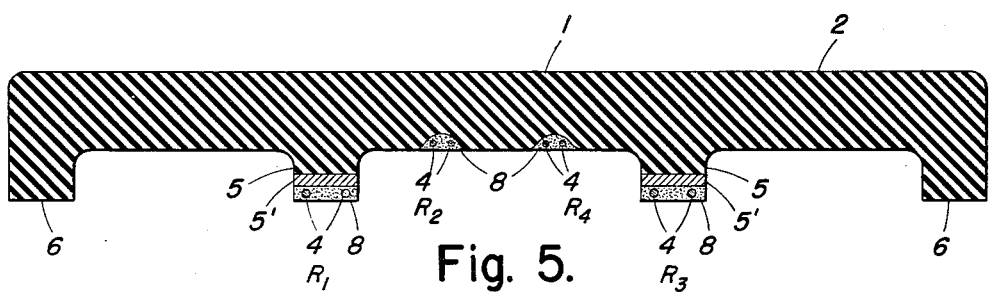
FIGURE 5 is a cross-sectional view of a further modification of the device shown in FIGURES 1 to 3 taken at an equivalent plane to that of FIGURE 3.

Temperature compensating elements may also be employed by mounting thereof on the under surface of the pad 2 as illustrated in FIGURE 5. Thus, as shown therein, two resistance filaments 4 which have the same value as the filaments 4 mounted in ridge members 5 are embedded in the recessed under surface of the pad between the various ridge members 5 and 6. Mounted in this manner these resistors 4 will be substantially non-strain responsive and will operate as temperature compensating resistance elements, e.g. $R_2$ and $R_4$, which, with the strain response resistance elements 4 in the ridge members 5 designated as $R_1$ and $R_3$, are suitably inter-connected to provide a standard bridge circuit arrangement wherein the strain responsive resistance elements $R_1$ and $R_3$ and temperature compensating elements $R_2$ and $R_4$ alternate. It will be evident that in this embodiment a single bridge circuit is disposed within a single vacuum pad or cup 2. The temperature compensating filaments or resistors 4 may be mounted in a similar manner to the strain-resistant filaments 4 positioned on the ridges 5. Alternatively, helically wound filaments, which are as a result of their coiled disposition substantially unaffected by strain and which correspond to the resistance elements $R_2$ and $R_4$ embedded in the pad 2 under the surface as illustrated in FIGURE 5, may be mounted on additional and similar ridge structures positioned parallel to those 5 upon which the strain-resistant filaments are mounted as seen in FIGURE 3. These additional ridge members need not be specially modified, as, for example, are those to which the strain-resistant filaments 4 are attached in FIGURE 5. As indicated above, these alternate structures serve the same purpose, which is the provision, in a single pad or gage, of a full bridge network such as that seen in FIGURE 8 to be discussed hereinafter, although differing therefrom in that two of the resistance elements alternating in the bridge circuit are not by virtue of the gage or pad structure itself strain-responsive in the present instance. The aforesaid alternate modifications are highly desirable structures by virtue of their convenience and also by reason of the temperature compensation realized. It is noted that where the coiled filament is wound about a tube or rod of like material to the test specimen, it is particularly useful for temperature compensating purposes. It will also be evident, unless otherwise specifically indicated herein, that the gage filaments are disposed along the pad ridges 5 in the U-shaped conformation indicated in FIGURE 2.

Figure 6:
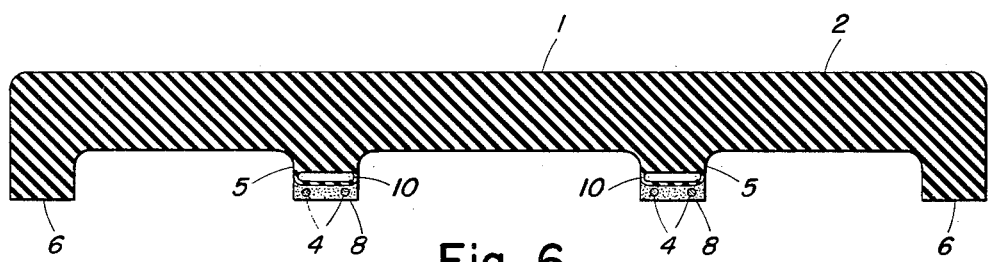
FIGURE 6 is a cross-sectional view of a still further modification of the device shown in FIGURES 1 to 3 inclusive taken at an equivalent level to that shown in FIGURE 3.

A further modification of the gage pad itself employed in the practice of the invention envisages a gage construction wherein a long, thin-walled pneumatic or hydraulic tube 10 is positioned on the bottom of each of the ridges 5 upon which a filament is to be imposed as seen in FIGURE 6. The gage wire filament 4 and frictional insulating material 8 are then cemented to the exposed surface of this tube which forms the outer edge of the ridge in each instance. The cement wire should constitute a relatively small cross-section to keep its resistance to elongation down. By this method a pressure in excess of atmospheric can also be readily attained due to the enlarged surface resulting which is continuous with the narrow ridge 5 in each instance. It is also noted that the resistance of these tubes to elongation is very low because there is a cushion of air between the wire and the relatively stiff body of the pad.

In addition to the drawings, reference is made to an illustrative dimensional break-down of the gage structures of the invention which will, it is believed, facilitate a complete understanding of the invention. Roughly, the flattened portion of the gage pad 2 exclusive of that portion of the pad defining an orifice for passage of lead wires, air tubes, and the like as described hereinafter is about one and three-eighths (1⅜) inches in length; three-quarters (¾) of an inch in width; and about one eighth (⅛) inch in thickness. The filament 4 is about .0007 inch in diameter.

As seen in the drawings the wire filament 4 positioned on each of the ridges 6 is disposed in a U-shaped conformation. The filament itself is formed of a suitable alloy, for example, "Evenohm" (Tradename), which is composed of 80% nickel and 20% chrome.

The abrasive surface 8 imposed upon the gage filament 4 to effect a significant frictional holding force and insulation therefor may be selected from any of a plurality of substances, illustratively, emery, diamond dust, Carborundum and a variety of silicates and the like.

Figure 7:
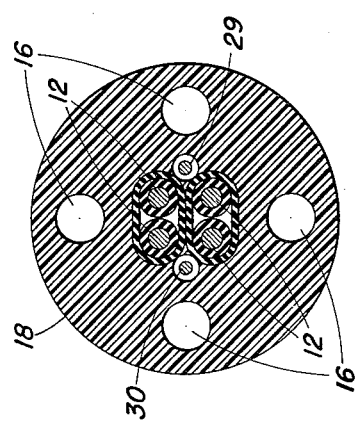
FIGURE 7 is a cross-sectional view taken along the line 7—7 of FIGURE 1.

The fine resistance wire 4 is joined at its terminal ends to conductive metal plates 11 formed of a suitable alloy, for example, Haynes #25 (a Tradename) or "Alloy 180" (a Tradename) manufactured by Wilber S. Driver. This joinder is accomplished by welding or soldering. The plate 11 may be, and indeed preferably is, very small and flat having, illustratively, a thickness of about .002 inch. This plate 11 serves to connect the filament 4 to the lead wires 12 which are normally formed of copper and substantially thicker than the wire filament 4. Alternatively, the wire filament 4 may be connected to the thermocouple lead wires 12 by means of wires of intermediate thickness soldered or otherwise suitably joined to the lead wires 12 at one end and welded to the terminal ends of the U-shaped filament 4. These intermediate lead wires 14 are desirably formed of Jelliff (a Tradename) resistance alloys, e.g. Jelliff #180. The lead wires 12 leave the under surface of the pad 2 through the orifice 14 in the gage pad 2 which serves also as the opening by which the air tubes 16 responsible for evacuation of air from the under surface of the pad 2 and remission of air thereto effect communication therewith. The lead wires 12 enter into and pass with the vacuum tubes 16 through the line 18. At that point where the line 18 enters the passage 14, a spiral spring 19 or other support means is present in the wall of the line 18 for reinforcement to prevent any impingement and closure of the vacuum tubes 16 at that point. Most desirably the air or vacuum tubes 16 are positioned peripherally within the line 18. Disposed in the center of the line 18 are the thermocouple lead lines 12 in this construction. There will be present at least two of these leads 12, one communicating with each terminus 11 of the U-shaped filament 4 in the manner described above. In one form there will be four such leads 12 centrally disposed in the line 18, and distributed as two pair; each pair communicating with a filament. It will be evident that a single air tube 16 will suffice rather than a plurality thereof as seen in FIGURE 7, and that if desired, this latter tube 16 may be positioned centrally in the line 18, and the lead wires 12 positioned peripherally therein. A simple alternative construction which is often preferred involves merely running the lead wires 12 freely through a flexible hose connection wherein the vacuum is simply created within the tube about and between the aforesaid lead wires.

Figure 9:
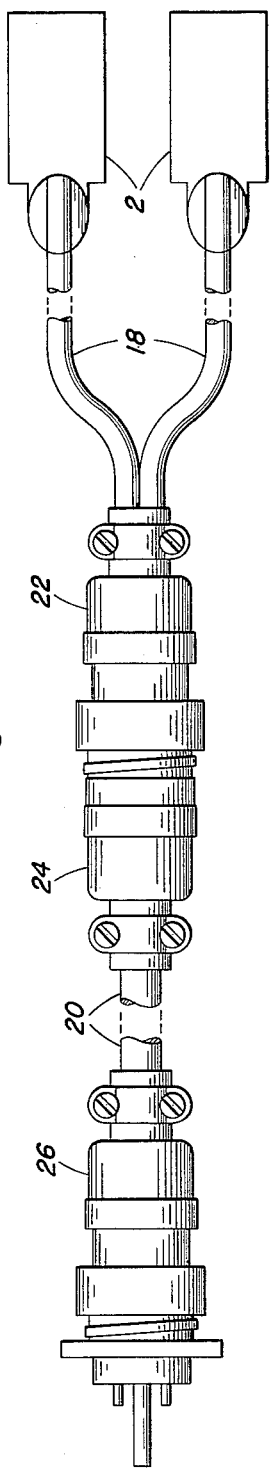
FIGURE 9 is an elevational view of the apparatus containing the bridge circuit shown in FIGURE 8.
Figure 8:
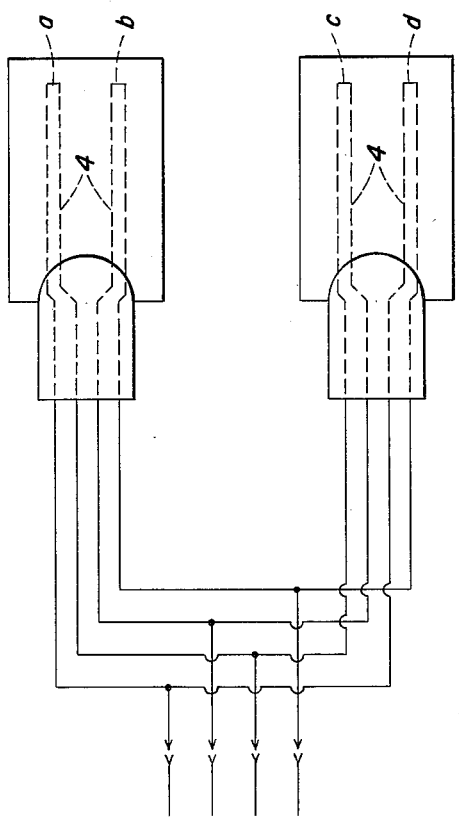
FIGURE 8 shows in plan view a bridge circuit employing the apparatus of the invention.

In a preferred assembly referred to briefly above, two vacuum gage cups 2, each containing two filaments 4 are employed to provide a bridge circuit wherein the aforesaid filaments 4 constitute the resistance elements a, b, c, and d thereof as seen in the plan view of FIGURE 8. Such a bridge arrangement may be employed, for example, in the measurement of bending strains in a cantilever beam, wherein one of the aforesaid pads 2 would be placed on top of the beam and one on the bottom thereof. In this manner tension would be communicated to the filaments of one pad and compression to the second set of filaments for a given direction of bending. Where only tension or only compression strains are had, only one pad of filaments would be employed on the test specimen. The second pad will be placed on a dummy piece of steel or a piece of metal of the same type as employed in the test structure for the purpose of temperature compensation. The two lines 18 incorporating vacuum and lead wires and extending from the gages 1 are suitably combined in a single cable 20 after joinder in the connecting plug 22 and socket 24, as seen in FIGURE 9. The cable 20 extends therefrom through a second plug 26 to the vacuum and electric power sources and strain measuring devices. The element 28 is illustrative of a further suitable socket for receiving the requisite combined vacuum and electric wires (see FIGURES 10 and 12).

It is noted that the lead wires 12 in the line 18 and the cable 20 are normally shielded and insulated; and that an additional insulated but unshielded wire or plurality thereof 30 may be present in these conduits 18 and 20 and extend to a vacuum pump, thus providing the means for inserting a remote control vacuum shut-off valve near the gage itself.

Figure 10:
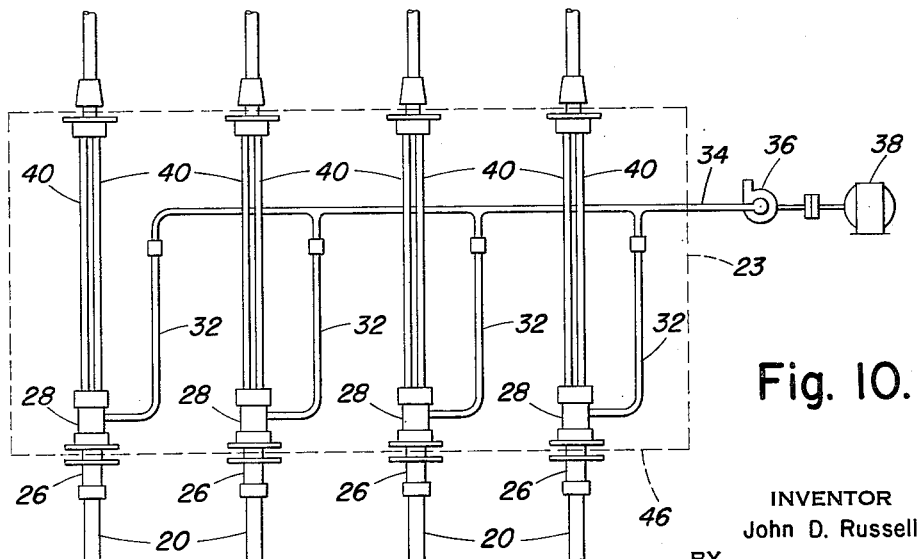
FIGURE 10 shows partially in plan view and partially in elevational view a device utilizing the device of FIGURES 8 and 9.

When desired, a plurality of bridge assemblies employing dual sets of vacuum cups or receptacles 2 and four filaments 4, two in each vacuum cup 2, as described above, may be utilized simultaneously by insertion of the plugs 26 thereof into the sockets 28 of a distribution panel or box 23 such as seen in FIGURE 10. A vacuum port 32 is present in each of the sockets 28. These vacuum ports 32 describe a passage for air between the sockets 28 and the vacuum manifold 34, which communicates directly with the vacuum pump 36 driven by the motor 38. Conduits 40 extend from the sockets 28 and contain the continuations of the lead wires 12 transmitted by the cable 20 from the gages 1 to suitable recording oscillographs, amplifiers, power sources, balance panels and the like.

Figure 11:
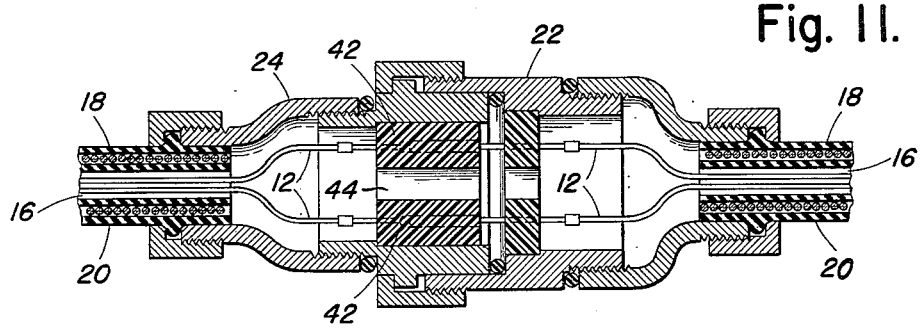
FIGURES 11 and 12 are sectional views depicting plugs and sockets in combination for use in the practice of the present invention.

A suitable plug and socket connection for effecting passage of the lead wires 12 and for effecting passage of air from the lines 18 and the evacuated gage cups 2 to the conduit 20 is seen in FIGURE 11 wherein the lead wires 12 are transmitted through and supported by the insulation 42 and through which is also provided a passage 44 for air.

Figure 12:
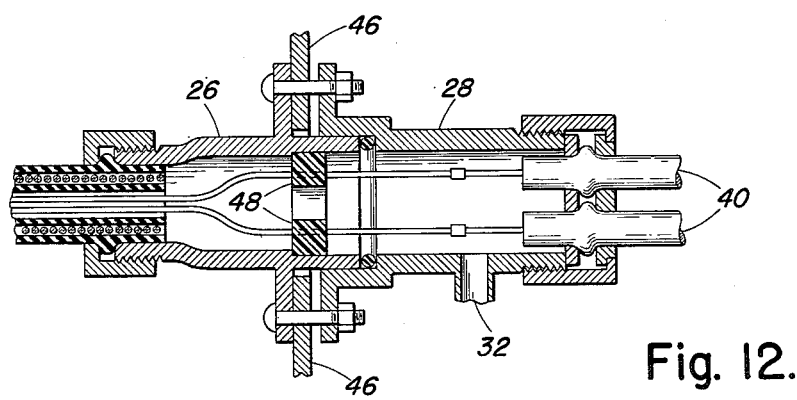

Another desirable connecting means for simultaneous transmission of air and electrical current is shown in FIGURE 12. The plug 26 and socket 28 employed in this arrangement are particularly adapted for use with the distribution chamber 23. Each of the sockets 28 is in this instance affixed to and supported in the wall 46 of the distribution chamber 23. Insulation 48 is provided to support the passage of the lead wires 12, and the sleeve 32 is described in the socket 28 to transmit air from the gages 1.

The vacuum system described herein may also serve the auxiliary purpose, where desired, of providing suction-held platforms for mounting of accelerometers and similar metering equipment on the test specimen. This equipment may of course be positioned adjacent the strain gages in the test area.

What is claimed is:

1. A wire strain gage comprising a flexible insulating receptacle; a strain responsive resistance filament mounted on the interior surface of said receptacle so as to be in contact with the test surface; a frictional and insulating coating applied to the surface of said filament; and means for producing a vacuum in said receptacle when the gage is applied to a test surface.

2. A wire strain gage comprising a flexible insulating, impermeable receptacle having a ridge formation disposed upon its interior surface; a strain responsive resistance filament mounted on said ridge formation; a frictional and insulating coating applied to the surface of said filament; and means for producing a vacuum in said receptacle when said gage is applied to a test surface.

3. A mounted wire strain gage comprising a flexible, insulating, impermeable receptacle having a ridge positioned on the interior surface thereof; a strain responsive resistance filament mounted on said ridge; a frictional and insulating coating applied to the surface of said filament; and means positioned outside of said receptacle and connected to the interior of said gage by means of an orifice defined in said receptacle; said means being capable of producing a vacuum within said receptacle when said gage is placed on a test surface.

4. A mounted wire strain gage comprising a flexible, insulating, fluid-impermeable receptacle having a plurality of ridges positioned on the interior surface thereof; a plurality of strain responsive resistance filaments mounted on said ridges; a frictional and insulating coating applied to the surface of each of said filaments; means connected to said receptacle for producing a vacuum therein when said receptacle is applied to a test surface; and means capable of communicating an electrical impulse to each of said filaments and capable of measuring the strain sensed by said filaments; said means being connected to each of said filaments.

5. A mounted wire strain gage comprising a flexible, insulating, fluid-impermeable receptacle having a plurality of ridges positioned on the interior surface thereof; a strain responsive resistance filament mounted on each of said ridges; a frictional and insulating coating applied to the surface of each of said filaments; means disposed exterior to said receptacle for producing a vacuum therein, said means communicating with the interior of said receptacle through an orifice defined in said receptacle; and means capable of conducting electrical current to each of said filaments and capable of recording the electrical response to strain sensed by each of the aforesaid filaments; said means being connected to said filaments by lead wires passing through the aforesaid orifice.

6. A mounted wire strain gage comprising a flexible, insulating, fluid-impermeable receptacle having a plurality of ridges positioned on the interior surface thereof; a strain responsive resistance filament mounted on each of said ridges; said ridges being characterized by a low resistance to elongation; a frictional and insulating coating applied to the surface of each of said filaments; means disposed exterior to said receptacle for producing a vacuum within said receptacle; and communicating with the interior of said receptacle by means of an orifice defined therein; said receptacle having a substantially smooth peripheral lip for contact with a test surface; means capable of conducting electrical current to each of said filaments; and capable of measuring the electrical response to strain sensed by each of the aforesaid filaments; said means being connected to said filaments by lead wires passing through the aforesaid orifice.

7. A mounted wire strain gage comprising a substantially flattened insulating, fluid-impermeable, resilient pad and ridge extending outwardly from said pad at an angle to the body thereof and about its periphery to form a receptacle thereof; said ridge being substantially smooth at its outer edge; a plurality of intermediate ridges positioned between said peripheral ridge and extending outwardly from the same side of said pad as the aforesaid peripheral ridge and within the receptacle established thereby; said latter ridge extending outwardly from the under surface of said pad to a point removed from the pad substantially equal to that attained by the intermediate ridges; a strain-responsive resistance filament mounted on each of said intermediate ridges; said ridges being characterized by a low resistance to elongation along the length of said filaments; a frictional and insulating coating applied to the surface of each of said filaments; means disposed exterior to said receptacle for producing a vacuum within said receptacle when said gage is applied to a test surface; and communicating with the interior of said receptacle by means of an orifice defined therein; means capable of conducting electrical current to each of said filaments; and capable of measuring the electrical response to strain sensed by each of the aforesaid filaments; said means being connected to said filaments by lead wires passing through the aforesaid orifice.

8. A wire strain gage assembly comprising an insulating, impermeable, flexible receptacle having two strain-responsive resistance filaments mounted on the surface thereof so as to be in contact with the test surface and two non-strain responsive resistance filaments mounted therein, lead wires connecting said resistance filaments to constitute a bridge circuit therebetween; each strain responsive filament mounted in said receptacle alternating with a non-strain responsive filament in said circuit; an insulating coating applied to the surface of each of said filaments; and means connected to the interior of said receptacle which is capable of producing a vacuum therein when said receptacle is applied to a test surface.

9. A wire strain gage assembly comprising an insulating, impermeable, flexible receptacle having a plurality of ridges disposed along the inner surface thereof; two strain-responsive resistance filaments mounted on the edge of individual ridge members; and two non-strain responsive, temperature compensating resistance filaments mounted within said receptacle; lead wires connecting said resistance filaments to constitute a bridge circuit therebetween; each strain-responsive filament alternating with a non-strain responsive filament in said circuit; an insulating coating applied to the surface of each of said filaments; and means connected to the interior of said receptacle which is capable of producing a vacuum therein when said receptacle is applied to a test surface.

References Cited in the file of this patent

UNITED STATES PATENTS

| | | |
|---|---|---|
| 2,009,721 | Williams | July 30, 1935 |
| 2,568,940 | Wolf | Sept. 25, 1951 |
| 2,958,221 | Bryant | Nov. 1, 1960 |
| 3,034,345 | Mason | May 15, 1962 |